US012521088B2

(12) United States Patent
Inukai et al.

(10) Patent No.: US 12,521,088 B2
(45) Date of Patent: Jan. 13, 2026

(54) SUPPORT TABLE AND VASCULAR PUNCTURE DEVICE

(71) Applicant: TERUMO KABUSHIKI KAISHA, Tokyo (JP)

(72) Inventors: Takito Inukai, Isehara (JP); Takumi Fukuda, Hadano (JP); Masashi Usami, Tokyo (JP); Yoichiro Kuwano, Machida (JP)

(73) Assignee: TERUMO KABUSHIKI KAISHA, Tokyo (JP)

( * ) Notice: Subject to any disclaimer, the term of this patent is extended or adjusted under 35 U.S.C. 154(b) by 280 days.

(21) Appl. No.: 18/325,659

(22) Filed: May 30, 2023

(65) Prior Publication Data

US 2023/0380802 A1 Nov. 30, 2023

(30) Foreign Application Priority Data

May 31, 2022 (JP) ................................ 2022-088203

(51) Int. Cl.
*A61B 8/00* (2006.01)
*A61B 8/08* (2006.01)
*A61B 8/14* (2006.01)
*A61B 17/34* (2006.01)

(52) U.S. Cl.
CPC ............ *A61B 8/4209* (2013.01); *A61B 8/085* (2013.01); *A61B 8/14* (2013.01); *A61B 8/461* (2013.01); *A61B 17/3403* (2013.01); *A61B 2017/3409* (2013.01)

(58) Field of Classification Search
CPC ......... A61B 8/4209; A61B 8/085; A61B 8/14; A61B 8/461; A61B 8/0841; A61B 8/4411; A61B 17/3403; A61B 2017/3409; A61B 2017/3413; A61B 5/489
See application file for complete search history.

(56) References Cited

U.S. PATENT DOCUMENTS 9,999,440 B2 6/2018 Sheldon et al.
2021/0378627 A1\* 12/2021 Yarmush ................ A61B 8/466

FOREIGN PATENT DOCUMENTS

CN 115068079 A \* 9/2022

OTHER PUBLICATIONS

Machine translation of CN 115068079 (Year: 2022).\*

\* cited by examiner

*Primary Examiner* — Peter Luong
(74) *Attorney, Agent, or Firm* — BUCHANAN INGERSOLL & ROONEY PC (57) ABSTRACT

Provided is a vascular puncture device including a support table that is capable of supporting a main body including an imaging unit that is capable of coming into contact with a skin surface of an arm of a human body and acquiring a cross-sectional image of the arm, a drive unit that moves a puncture needle, and a control unit that is capable of controlling a movement of the drive unit, the support table including a holding unit capable of holding the arm, in which the support table is capable of supporting the main body and being separated from the main body.

20 Claims, 6 Drawing Sheets

SUPPORT TABLE AND VASCULAR PUNCTURE DEVICE

CROSS-REFERENCES TO RELATED APPLICATIONS

This application is based on and claims priority to Japanese Patent Application No. 2022-088203 filed on May 31, 2022, the entire content of which is incorporated herein by reference.

TECHNOLOGICAL FIELD

The present invention generally relates to a support table for supporting a main body capable of detecting a position of a blood vessel from an image acquired by an echographic apparatus and puncturing the blood vessel, and a vascular puncture device.

BACKGROUND DISCUSSION

In order to secure an access route to a blood vessel for drug administration and endovascular treatment, vascular puncture is performed in which a human body is punctured with an inner needle having a sharp needle tip, the inner needle being covered by a flexible outer tube. The access route can be secured due to the outer tube since only the inner needle is removed after the inner needle and the outer tube reach the inside of the blood vessel. In the vascular puncture, since the blood vessel cannot be visually observed from a skin surface, an operator estimates a blood vessel position by using standard knowledge of the travel direction of the blood vessel and skill such as palpation of blood vessel pulsation.

In recent years, there is a device that automatically performs vascular puncture. An example is disclosed in U.S. Pat. No. 9,999,440.

SUMMARY

The device described in U.S. Pat. No. 9,999,440 includes a table capable of supporting a puncture robot, but this table is not configured to hold an arm to be punctured. For this reason, the puncture position is likely to shift when puncturing is performed. Therefore, it is difficult to perform automatic puncture on a target position of a patient with high accuracy.

Meanwhile, in a puncturing procedure, a device for performing puncturing and a portion of the arm to be punctured are disposed in a sterile field, and other portions are disposed in an unsterile field. Normally, the sterile field and the unsterile field are defined by a drape. The relationship between the sterile field and the unsterile field is desirably maintained until the puncture is completed in the puncturing procedure.

A support table disclosed here can prevent a puncture position from being shifted, on which a drape can be easily disposed between a main body and the support table, and that can easily maintain a state in which a main body side is set to a sterile field and a support table side is set to an unsterile field until puncture is completed, and a vascular puncture device.

The support table that is capable of supporting a main body includes an imaging unit that is capable of coming into contact with a skin surface of an arm of a human body and acquiring a cross-sectional image of the arm, a drive unit that moves a puncture needle, and a control unit that is capable of controlling a movement of the drive unit, the support table comprising a holding unit that is capable of holding the arm, in which the support table is capable of supporting the main body and capable of being separated from the main body.

In the above-described configuration, since the support table can hold the arm on the holding unit, it is possible to prevent the puncture position from being shifted. Furthermore, since the support table can be separated from the main body, the drape can be easily disposed between the main body and the support table, and a state in which the main body side is set to a sterile field and the support table side is set to an unsterile field can be easily maintained until the puncture is completed.

Another aspect of the disclosure here involves the combination of a support table and a main body forming part of a vascular puncture device for puncturing an arm of a human body. The support table comprises a lower frame and an arm holder on which the arm of the human body is positioned during the puncturing of the arm of the human body. The lower frame includes a bottom portion and two spaced-apart side walls that project upwardly away from the bottom portion, and the arm holder is located between the two spaced-apart side walls. The arm holder includes an upwardly facing surface that faces the arm of the human body during the puncturing of the arm of the human body, and the arm holder is supported on the bottom portion of the lower frame. The main body comprises an upper frame and a needle, with the upper frame being positioned on and supported by the lower frame. The needle is supported on the upper frame, and the needle includes a needle tip for puncturing the arm of the human body when the arm of the human body is positioned on the arm holder. The needle is movable relative to the upper frame so that the needle is movable toward the arm of the human body when the arm of the human body is positioned on the arm holder to permit the arm of the human body to be punctured by the needle tip. The upper frame is separable from the lower frame.

According to another aspect, a vascular puncture device comprises a main body including an imaging unit that is brought into contact with a skin surface of an arm of a human body during use of the vascular puncture device and that acquires a cross-sectional image of the arm, puncture needle connected to a drive unit that moves the puncture needle, and a control unit that is configured to control movement of the drive unit. A holding unit is configured to hold the arm. A support table is configured to support the main body in a manner allowing the support table to be separated from the main body.

BRIEF DESCRIPTION OF THE DRAWINGS

FIGS. 8A and 8B are views illustrating a vascular puncture device according to a fourth modification example, in which

FIGS. 9A and 9B are views illustrating a vascular puncture device according to a fifth modification example, in which

FIGS. 10A and 10B are views illustrating a vascular puncture device according to a sixth modification example, in which

DETAILED DESCRIPTION

Hereinafter, embodiments of a support table, representing examples of the new support table disclosed here, will be described with reference to the accompanying drawings. The dimensional ratios of the drawings are exaggerated for illustration purpose and may differ from actual ratios.

A vascular puncture device 10 according to an embodiment disclosed by way of example is used when puncturing an arm A of a human body. The vascular puncture device 10 acquires a cross-sectional image of the arm A, detects a position of a blood vessel to be punctured, and automatically punctures the blood vessel.

As illustrated in FIGS. 1 to 4, the vascular puncture device 10 includes a main body 20 that automatically punctures a blood vessel, and a support table 30 that overlaps or overlies the main body 20 in a height direction Z and is disposed under the main body 20 to support the main body 20. The height direction Z is a direction perpendicular to a horizontal plane when the vascular puncture device 10 is disposed on the horizontal plane. The main body 20 includes an upper frame 21, an imaging unit 40 that comes into contact with a skin surface to acquire a cross-sectional image of a human body, a puncture unit 50 that performs puncture, a drive unit 60 that moves the puncture unit 50 with respect to the imaging unit 40 (or the upper frame 21), a control unit 70 that performs image analysis of the cross-sectional image and controls the drive unit 60, and a display unit 90 that can display the cross-sectional image.

Figure 2:
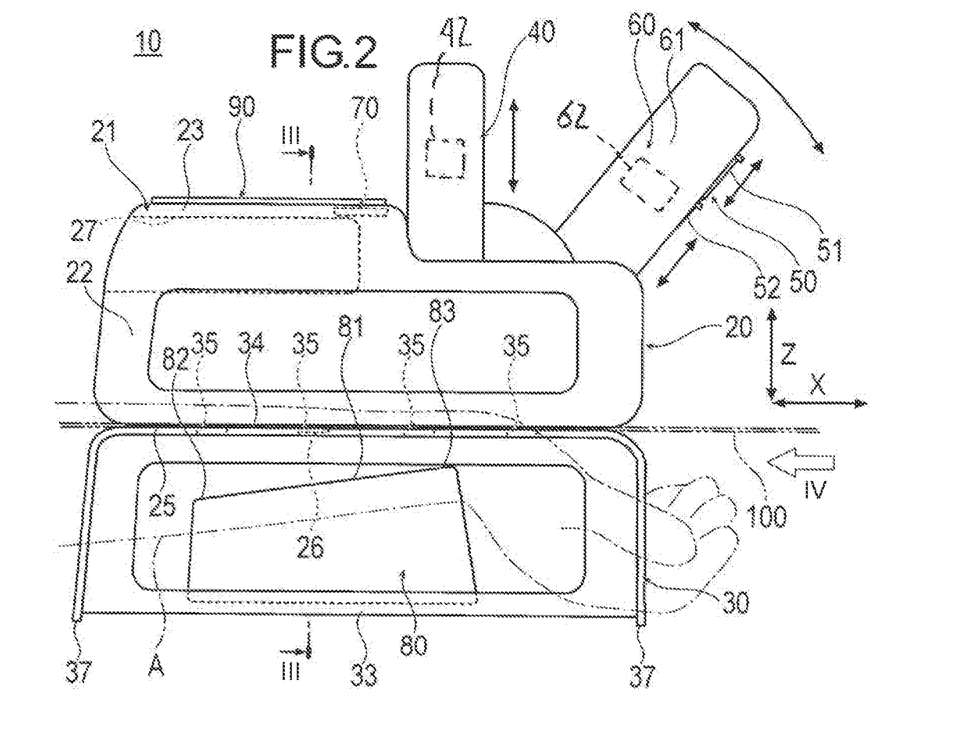
FIG. 2 is a side view of a vascular puncture device according to the embodiment.

The imaging unit 40 is fixed to the upper frame 21 and has a probe 41 that generates and transmits an ultrasonic wave and receives the ultrasonic wave (echo) reflected from the inside of a living body at the lower end of the imaging unit 40. The probe 41 is formed to be long (elongated) in a width direction Y orthogonal to a length direction X corresponding to an extending direction of the arm A of the human body disposed in the vascular puncture device 10, and can obtain a cross-sectional image orthogonal to an axial direction of the blood vessel inside the human body. The length direction X and the width direction Y are directions orthogonal to each other and perpendicular to the height direction Z. A probe drive unit that moves the probe 41 in the height direction Z is provided inside the imaging unit 40 (an example of a probe drive unit 42 is schematically illustrated in FIG. 2). A distance between the probe 41 and the arm A is adjusted by the probe drive unit, and thus it is possible to capture an image with less noise and to prevent deformation of the skin or blood vessel, which is caused due to excessive contact. The probe drive unit may be inside the imaging unit 40, or may be disposed between the upper frame 21 and the imaging unit 40 to move the entire imaging unit 40.

The upper frame 21 is formed in a substantially arch shape protruding upward as viewed in the length direction X. The upper frame 21 includes two upper side walls 22 formed on both sides in the width direction Y (the two upper side walls 22 are spaced apart from each other in the width direction Y), a top surface portion 23 connecting the two upper side walls 22, and an opening portion 24 in which the imaging unit 40 and the puncture unit 50 are disposed. The upper frame 21 is formed of, for example, a hard resin material.

Each of the upper side walls 22 has a main body connection surface 25 at a lower end of the upper side wall 22. Each of the main body connection surfaces 25 has at least one protrusion 26 as a connection portion connectable to the support table 30. In the present embodiment, each of the main body connection surfaces 25 has one protrusion 26.

In the top surface portion 23, the display unit 90 that displays an image captured by the imaging unit 40 is disposed on a surface facing upward. In the top surface portion 23, a gripping hole 27 is formed toward a peripheral side (side close to a fingertip of the arm A) in the length direction X on a surface on a central side of the upper frame 21 (side close to the arm A near a shoulder) in the length direction X. The gripping hole 27 can be used by an operator to lift the main body 20 with a hand. The gripping hole 27 extends from the central side of the top surface portion 23 toward the center of gravity of the main body 20. The gripping hole 27 may or may not reach the center of gravity of the main body 20. Since the gripping hole 27 is formed close to the center of gravity, the operator can easily lift the main body 20 with one hand without dropping the main body.

Figure 1:
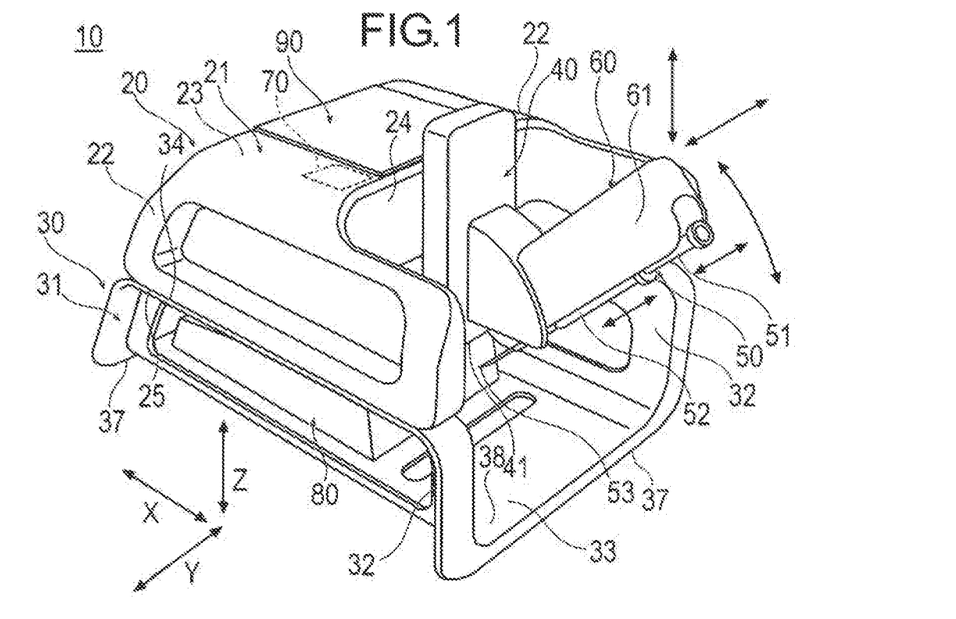
FIG. 1 is a perspective view of a vascular puncture device according to an embodiment.

The opening portion 24 is formed in a recessed shape on the peripheral side of the upper frame 21 in length direction X when viewed from above. That is, the top surface portion 23 is formed on the peripheral side and is shorter than the upper side wall 22 in the length direction X, and thus the opening portion 24 is formed in the upper frame 21. Stated differently, as shown in FIG. 1, the top surface portion 23 has a length in the length direction X that is shorter than the length of each of the upper side walls 22 in the length direction X. The opening portion 24 is disposed on the peripheral side of the top surface portion 23. The arm A to be imaged by the imaging unit 40 and punctured with the puncture unit 50 is exposed from the opening portion 24. The imaging unit 40 is connected to the opening portion 24. The imaging unit 40 may be detachable or may not be detachable from the opening portion 24.

As illustrated in FIGS. 1 and 2, the puncture unit 50 includes a metallic inner needle 51 having a sharp needle tip 53 formed at the distal end, and a flexible tubular outer tube 52 disposed so as to cover the outer circumferential surface of the inner needle 51. In a state in which the outer tube 52 covers the outside of the inner needle 51, the needle tip 53 of the inner needle 51 protrudes from the outer tube 52. The inner needle 51 and the outer tube 52 can be attached to and detached from a needle holding unit 61 of the drive unit 60.

The drive unit 60 is a drive source for automatically adjusting a position to be punctured and performing the puncture operation by being controlled by the control unit 70 and changing the position and/or angle of the puncture unit 50. The drive unit 60 is connected to the imaging unit 40 or the upper frame 21 and disposed in the opening portion 24. The drive unit 60 has a mechanism for inclining the entire puncture unit 50 with respect to the upper frame 21, a mechanism for moving the entire puncture unit 50 in the width direction, a mechanism for moving the puncture unit 50 in a vertical direction, a mechanism for moving the inner needle 51 forward and backward in a puncture direction, and a mechanism for moving the outer tube 52 forward and backward along the inner needle 51. The drive unit 60 is configured by combining, for example, a rotary drive source such as a motor (an example of a rotary drive source such as a motor 62 is schematically illustrated in FIG. 2), a structure for converting a rotary motion of the rotary drive source into a linear motion (for example, a feed screw mechanism), and a structure for changing an angle (for example, a hinge), but the configuration of the drive unit is not limited to such examples. The drive unit 60 has a needle holding unit 61 that detachably holds the inner needle 51 and the outer tube 52.

The control unit 70 can receive image information from the probe 41 of the imaging unit 40 and form a cross-sectional image. Moreover, the control unit 70 can cause the display unit 90 to display the obtained cross-sectional image. The control unit 70 includes, as physical configurations, a storage circuit (register) and an arithmetic circuit (ALU). The storage circuit can store programs and various parameters. The arithmetic circuit can perform arithmetic processing.

The control unit 70 may be disposed in the upper frame 21, or may be disposed in the imaging unit 40 or the drive unit 60. Alternatively, the control unit 70 may be configured separately from the main body 20.

The control unit 70 can specify a position of the blood vessel in the image by analyzing the acquired cross-sectional image. Furthermore, the control unit 70 can detect a relative position of the inner needle 51 with respect to the imaging unit 40 by performing image analysis. Note that since the outer tube 52 is made of resin, it is not detected using the ultrasonic wave. However, for example, in a case where the outer tube 52 is made of a resin containing metal, the control unit 70 can detect the relative position of the outer tube 52 with respect to the imaging unit 40 since the outer tube 52 can be detected using the ultrasonic wave. Furthermore, the control unit 70 can cause the display unit 90 to display the cross-sectional image by analyzing the obtained cross-sectional image. Moreover, the control unit 70 can adjust the position and angle of the puncture unit 50 and automatically perform puncture using the inner needle 51 and the outer tube 52 at the desirable position and angle by controlling the drive unit 60.

Figure 3:
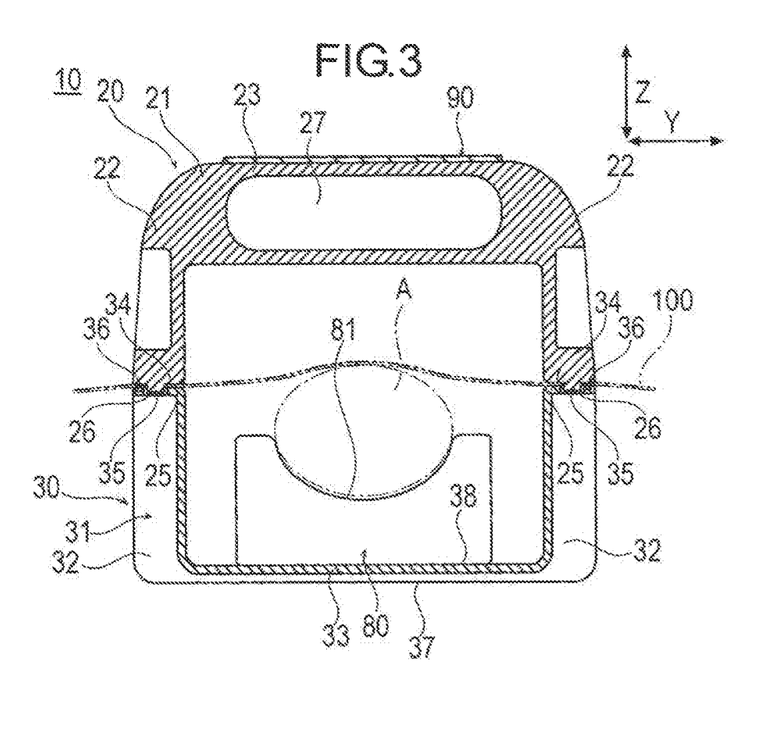
FIG. 3 is a cross-sectional view taken along the section line III-III of FIG. 2.

As illustrated in FIGS. 1 to 3, the display unit 90 is a monitor or the like that is configured to display a cross-sectional image. The display unit 90 is preferably disposed near the puncture unit 50 that performs puncture. The display unit 90 is disposed, for example, on an upper-facing surface of the top surface portion 23 adjacent to the opening portion 24 in which the puncture unit 50 is disposed. As a result, the operator can view the punctured skin of the arm A while viewing the cross-sectional image of the blood vessel on the display unit 90. The display unit 90 may be disposed separated from the main body 20 and the support table 30.

As illustrated in FIGS. 1 to 4, the support table 30 includes a lower frame 31 and a holding unit (human arm holder) 80 that holds the arm A. The lower frame 31 is formed in a substantially arch shape protruding downward as viewed in the length direction X. The lower frame 31 has two lower side walls 32 formed on both sides in the width direction Y, and a bottom surface portion 33 connecting the two lower side walls 32. The lower frame 31 is formed of, for example, a hard resin material.

Each of the lower side walls 32 has a support table connection surface 34 at an upper end of the lower side walls 32. The support table connection surface 34 can support the main body connection surface 25 while facing the main body connection surface 25 of the main body 20. A drape 100 can be sandwiched between the support table connection surface 34 and the main body connection surface 25. The drape 100 is a flexible sheet-like member, and can be used to define a sterile field and an unsterile field. The configuration of the drape 100 is not particularly limited as long as it has a flexible sheet shape. Each of the support table connection surfaces 34 has at least one recess 35 as a connection portion connectable to the main body 20. In the present embodiment, each of the support table connection surfaces 34 has a plurality of the recesses 35 disposed at predetermined intervals in the length direction X. The recess 35 may or may not penetrate the support table connection surface 34. Each of the recesses 35 can be fitted to or positioned in one of the protrusions 26 of the main body connection surface 25 via the drape 100. That is, a portion of the drape 100 may be located between each of the recesses 35 and the respective protrusion 26. Therefore, when the protrusion 26 is directly fitted to the recess 35 without interposing the drape 100, a gap is formed (i.e., a space exists) between the protrusion 26 and the recess 35. In the vicinity of each recess 35 or a recessed portion of the recess 35, a visual recognition unit 36 that can be visually recognized by the operator via the drape 100 is formed. The visual recognition unit 36 is an illumination unit capable of emitting light, such as an LED. A power supply and cable (not illustrated) for supplying power to the visual recognition unit 36 are disposed in the support table 30. Since the operator can visually recognize the visual recognition unit 36 that emits light through the drape 100, the operator can recognize the position of the recess 35 of the support table 30 covered by the drape 100 and easily fit the protrusion 26 to the recess 35. Moreover, in a case where the visual recognition unit 36 is located in the recessed portion of the recess 35, when the operator fits the protrusion 26 to the recess 35, the protrusion 26 covers the visual recognition unit 36 located in the recessed portion of the recess 35. As a result, the operator cannot see the light emission of the visual recognition unit 36, and thus the operator can recognize that the protrusion 26 is completely fitted to the recess 35. In the present embodiment, as the connection portion, the protrusion 26 is formed on the main body 20 and the recess 35 is formed on the support table 30, but a recess may be formed on the main body 20 and a protrusion may be formed on the support table 30. In this case, the visual recognition unit may be disposed on a protruding portion of the protrusion of the support table 30. Accordingly, when the operator fits the protrusion to the recess, the recess covers the visual recognition unit located on the protruding portion of the protrusion. As a result, the operator cannot see the light emission of the visual recognition unit, and thus the operator can recognize that the protrusion 26 is completely fitted to the recess 35.

The bottom surface portion 33 has a bottom surface 37 in contact with an operation table or the like and a placement surface 38 facing upward. The holding unit 80 that holds the arm A is fixed to the placement surface 38.

Figure 4:
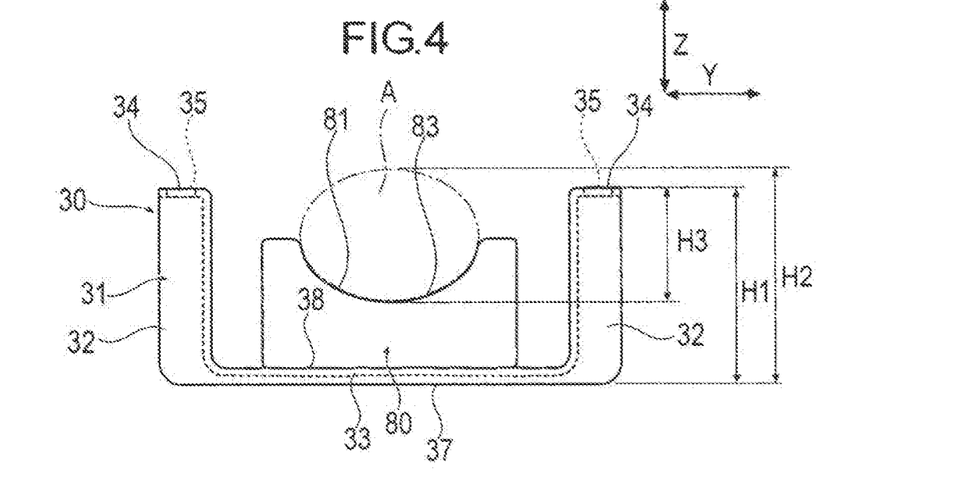
FIG. 4 is a front view of a support table when viewed from an arrow IV in FIG. 2.

As illustrated in FIGS. 2 to 4, the holding unit 80 has a holding surface 81 that can hold the arm A on the upper surface. The holding surface 81 is formed in a groove shape corresponding to the shape of the arm A so as to stably hold the arm A in the length direction X. The holding surface 81 includes a first holding surface 82 that can hold an elbow side (central side) of the arm A and a second holding surface 83 that can hold a wrist side (peripheral side) of the arm A. The height from the bottom surface 37 of the support table 30 to the second holding surface 83 is preferably higher than the height from the bottom surface 37 to the first holding surface 82. The height from the bottom surface 37 to the holding surface 81 gradually increases from the elbow side (central side) toward the wrist side (peripheral side) in the length direction X. Therefore, the arm A can be stably held by the holding unit 80 in a state in which a palm side of the wrist is facing upward and the wrist is bent downward to stretch the skin of the arm A (see FIG. 2). The height from the bottom surface 37 to the holding surface 81 gradually increases toward the puncture unit 50 of the main body 20 in the length direction X. That is, the holding surface 81 is inclined with respect to the bottom surface 37. As a result, it is possible to bring the puncture unit 50 of the main body 20 into contact with the arm A in a state in which the skin of the arm A located at a position with which the puncture unit 50 of the main body 20 comes into contact is stretched. Therefore, it is possible to prevent the skin from moving so as to be displaced and the puncture position from being shifted at the time of puncture. The holding unit 80 is preferably deformable and flexible. Therefore, since the holding unit 80 can be deformed according to the shape of the arm A, the arm A can be stably held, and the pain of the patient can be reduced. The holding unit 80 is formed of, for example, a deformable porous resin material. The holding unit 80 may not be deformable and may have a structure integrated with the lower frame 31.

As illustrated in FIG. 4, the height from the bottom surface 37 to the uppermost surface of the support table 30, that is, a height H1 from the bottom surface 37 to the support table connection surface 34 preferably does not exceed a height H2 from the bottom surface 37 to the highest position of the arm A held by the holding unit 80. When the height H2 exceeds the height H1, a position at which the arm A is punctured is located below the support table connection surface 34 that supports the drape 100, and thus the workability of puncturing is deteriorated. Since the thickness from a back side to the palm side of the arm A of a general human is about 50 mm, a height H3 from the lowest position of the second holding surface 83 formed in U-shape in the holding surface 81 to the support table connection surface 34 is preferably equal to or less than 50 mm.

Next, a method of using the vascular puncture device 10 according to the present embodiment will be described. First, the operator places the support table 30 on an unsterile field such as an operation table, and disposes the arm A of a patient on the holding surface 81. At this time, the arm A is disposed on the holding surface 81 in a state in which the palm side of the wrist is facing upward and the wrist is bent downward. Therefore, when performing puncture after that, it is possible to prevent the skin from moving so as to be displaced and the puncture position from being shifted at the time of puncture.

Next, as illustrated in FIGS. 2 to 3, the operator covers the support table 30 and the arm A with the sterilized drape 100. At this time, a hole provided on the drape 100 is aligned with a portion of the arm A to be punctured. As a result, the portion of the arm A to be punctured is exposed from the drape 100. The drape 100 covers the support table connection surfaces 34 on opposite sides of the support table 30. Therefore, a range including the support table 30 under the drape 100 can be maintained as the unsterile field, and the range above the drape 100 can be maintained as the sterile field.

Next, the operator causes the visual recognition unit 36 of the support table 30 to emit light, and recognizes the position of the recess 35 by using the light transmitted through the drape 100. Subsequently, the operator selects the recess 35 to which the protrusion 26 of the main body 20 is fitted among a plurality of the recesses 35 disposed in the length direction X, and fits the protrusion 26 to the recess 35 (i.e., positions the protrusion 26 in the respective recess 35). As a result, since the operator can recognize the position of the recess 35 by using the visual recognition unit 36 of the support table 30, the protrusion 26 of the main body 20 can be easily and reliably fitted (connected) to the recess 35 of the support table 30. Furthermore, since the operator can select the recess 35 to which the protrusion 26 is fitted, the position of the main body 20 with respect to the support table 30 in the length direction X can be easily adjusted to a desired position for the catheter procedure.

Since a gap is provided between the recess 35 and the protrusion 26, the protrusion 26 can be fitted to the recess 35 by sandwiching the drape 100. The drape 100 is sandwiched and held between the support table connection surface 34 and the main body connection surface 25. The operator can easily dispose the arm A and the drape 100 in the vascular puncture device 10 only by sandwiching the drape 100 between the support table 30 and the main body 20 without damaging or removing the drape 100.

Thereafter, the operator actuates the vascular puncture device 10. As a result, the drive unit 60 and the imaging unit 40 are controlled by the control unit 70, and the blood vessel is automatically punctured. The vascular puncture device 10 may include a button or a microphone for performing puncture. When the operator presses the button or gives an instruction by voice via the microphone, the control unit 70 can activate the drive unit 60 to execute puncture. When puncturing the blood vessel, the operator can view the punctured skin of the arm A while viewing the cross-sectional image of the blood vessel on the display unit 90. Therefore, the operator can easily confirm whether the target position of the blood vessel can be punctured.

The drive unit 60 controlled by the control unit 70 causes the distal end of the inner needle 51 to reach the inside of the blood vessel together with the outer tube 52. Thereafter, the drive unit 60 draws out the inner needle 51 from the outer tube 52 by causing the inner needle 51 to move backward in a state in which the distal end of the outer tube 52 remains in the blood vessel. The backward movement of the inner needle 51 may be manually performed by the operator.

When the vascular puncture performed by the vascular puncture device 10 is completed, the operator removes both or one of the inner needle 51 and the outer tube 52 from the drive unit 60. Next, the operator grips the gripping hole 27 and lifts the main body 20 to detach and remove the main body 20 from the support table 30. At this time, since both or one of the inner needle 51 and outer tube 52 removed from the drive unit 60 is disposed in the opening portion 24 opened to the peripheral side of the main body 20, the main body 20 can be removed without hooking both or one of the inner needle 51 and the outer tube 52 on the main body 20. Therefore, the state in which the outer tube 52 is inserted into the blood vessel can be favorably maintained. The main body 20 can be removed with little impact on the drape 100. Therefore, when the main body 20 is removed, the relationship between the sterile field and the unsterile field can be maintained. After removing the main body 20, the operator can perform a catheter procedure by using the outer tube 52.

As described above, the support table 30 according to the present embodiment can support the main body 20 including the imaging unit 40 that can come into contact with the skin surface of the arm A of the human body and acquire the cross-sectional image of the arm A, the drive unit 60 that moves a puncture needle (inner needle 51), and the control unit 70 that can control the movement of the drive unit 60. The support table 30 includes the holding unit 80 capable of holding the arm A, can support the main body 20 and be separated from the main body 20. As a result, since the support table 30 can hold the arm A on the holding unit 80, it is possible to prevent the puncture position from being shifted. Therefore, the support table 30 can assist the operator in puncturing a desired puncture position of the human body with the puncture needle (inner needle 51) with high accuracy. Furthermore, since the support table 30 can be separated from the main body 20, the drape 100 can be easily disposed between the main body 20 and the support table 30, and a state in which the main body 20 side is set to a sterile field and the support table 30 side is set to an unsterile field can be easily maintained until the puncture is completed.

The support table 30 has a connection portion for connecting the support table 30 to the main body 20. Therefore, the main body 20 and the support table 30 can be connected in an appropriate positional relationship. The structure of the connection portion is not particularly limited as long as the main body 20 and the support table 30 can be connected with the drape 100 interposed therebetween.

The connection portion of the support table 30 has a protrusion or a recess 35 that can be fitted to a recess or a protrusion 26 provided in the main body 20, and a gap is formed between the protrusion 26 and the recess 35 when the protrusion 26 is directly fitted to the recess 35. Therefore, it is possible to fit the protrusion 26 to the recess 35 via the drape 100 while interposing the drape 100 in the gap between the protrusion 26 and the recess 35.

The support table 30 may have a visual recognition unit 36 that can be visually recognized at a connection portion of the support table 30. Therefore, since the operator cannot visually recognize the visual recognition unit 36, the operator can reliably recognize that the main body 20 is connected to the connection portion of the support table 30.

The support table 30 may have the visual recognition unit 36 that can be visually recognized at the recess 35 or protrusion of the support table 30. Therefore, the protrusion 26 of the main body 20 is fitted to the recess 35 of the support table and thus the operator cannot visually recognize the visual recognition unit 36. Therefore, the operator can reliably recognize that the main body 20 is connected to the support table 30.

The support table 30 has a plurality of the connection portions (for example, recesses 35) at different positions. Therefore, it possible to connect the main body with the support table 30 at different positions.

The holding unit 80 has a first holding surface 82 that can hold the elbow side of the arm A and a second holding surface 83 that can hold the wrist side of the arm A. The height from the bottom surface 37 of the support table 30 to the second holding surface 83 is higher than the height from the bottom surface 37 to the first holding surface 82. Therefore, the arm A can be stably held by the holding unit 80 in a state in which a palm side of the wrist is made face upward and the wrist is bent downward to stretch the skin of the arm A. Therefore, it is possible to prevent the skin from moving so as to be displaced and the puncture position from being shifted at the time of puncture.

The holding unit 80 is flexible and deformable. Because the holding unit 80 can be deformed according to the shape of the arm A, the arm A can be stably held, and the pain of the patient can be reduced.

The holding unit 80 has a holding surface 81 inclined with respect to the bottom surface 37 of the support table 30. Therefore, it is possible to dispose the arm A on the holding surface 81 with the wrist side higher than the elbow side of the arm A, and to stably hold the arm A on the holding surface 81.

Furthermore, the vascular puncture device 10 according to the present embodiment includes a main body 20 including an imaging unit 40 that can come into contact with the skin surface of the arm A of the human body and acquire the cross-sectional image of the arm A, a drive unit 60 that moves a puncture needle (inner needle 51), and a control unit 70 that can control the movement of the drive unit 60, a holding unit 80 that can hold the arm A, and a support table 30 that can support the main body 20 and be separated from the main body 20. Therefore, since the vascular puncture device 10 can hold the arm A on the holding unit 80 of the support table 30, it is possible to prevent the puncture position from being shifted. Therefore, the vascular puncture device 10 can puncture a desired puncture position of the human body with the puncture needle (inner needle 51) with high accuracy. Furthermore, since the support table 30 can be separated from the main body 20, the drape 100 can be easily disposed between the main body 20 and the support table 30, and a state in which the main body 20 side is set to a sterile field and the support table 30 side is set to an unsterile field can be easily maintained until the puncture is completed.

The main body 20 includes a display unit 90 that can display a cross-sectional image captured by the imaging unit 40. Therefore, the operator can confirm both the punctured portion of the arm A and the display unit 90 without greatly changing the line of sight, and thus the operability in puncturing is improved.

The present invention is not limited to only the above-described embodiments, and various modifications can be made by those skilled in the art within the technical idea of the present invention. For example, the connection portion disposed on the main body 20 and/or the support table 30 is not limited to the recess or the protrusion which can be fitted, and may be a step, for example. Other steps and corners of the opposing member can be fitted to the steps.

Figure 5:
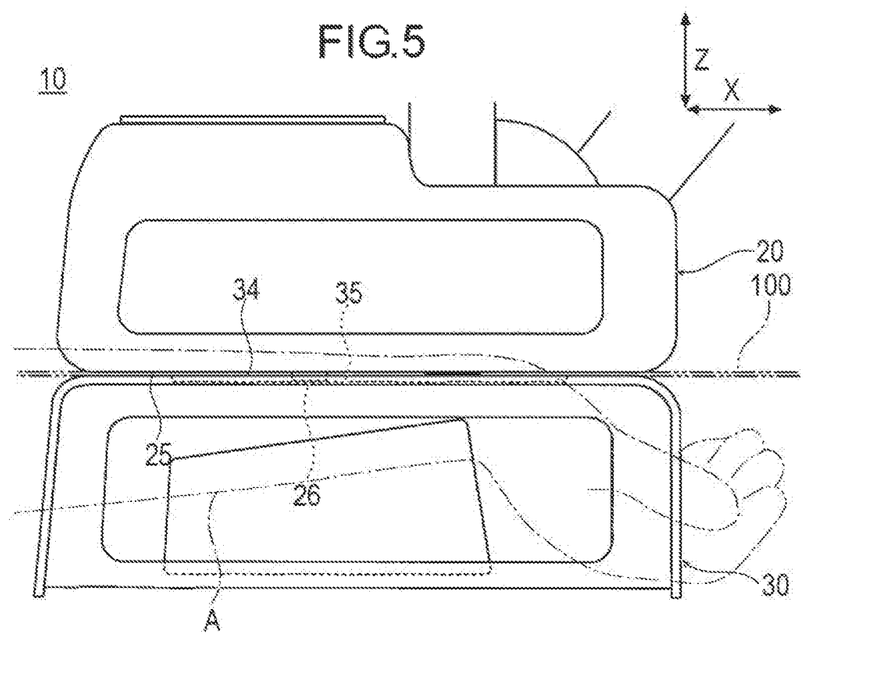
FIG. 5 is a side view of a vascular puncture device according to a first modification example.

Furthermore, as in a first modification example illustrated in FIG. 5, the recess 35 of the support table 30 may be formed in a groove shape or a slit shape, which is long in the length direction X. As a result, the protrusion 26 of the main body 20 is movable so as to slide along the recess 35. Therefore, the main body 20 can be connected to the support table 30 at an arbitrary position (desired or selected position) in the length direction X.

Figure 6:
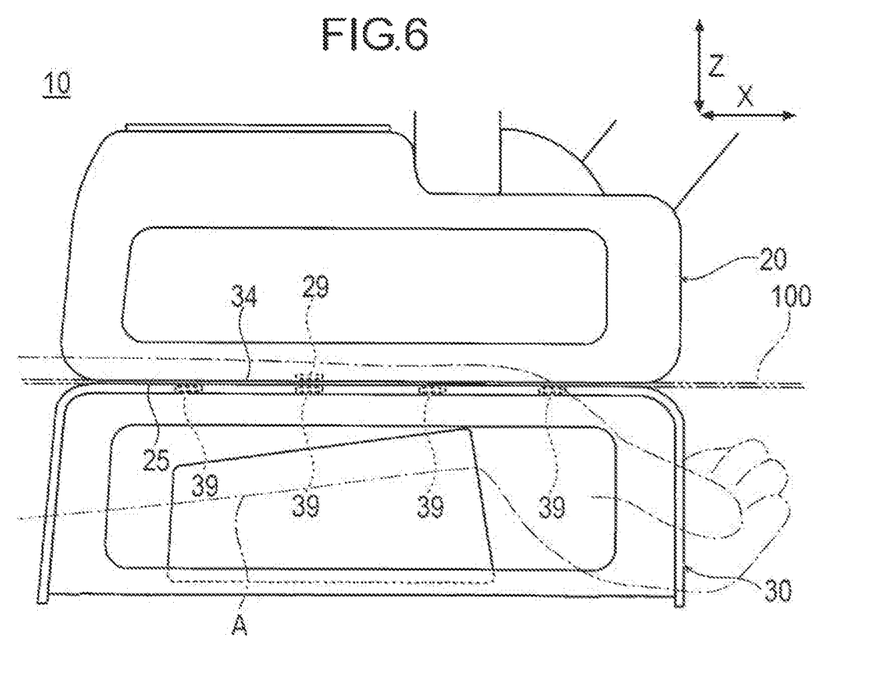
FIG. 6 is a side view of a vascular puncture device according to a second modification example.

Furthermore, in a second modification example illustrated in FIG. 6, the connection portions may be connected by magnetic force. Both of a first connection portion 29 disposed on the main body 20 and a second connection portion 39 disposed on the support table 30 are ferromagnetic portions, and the first connection portion 29 and the second connection portion 39 can attract each other since at least one of the first connection portion 29 or the second connection portion 39 is magnetized. As long as one of the first connection portion 29 and the second connection portion 39 is a ferromagnetic portion having magnetism, the other thereof may be or may not be magnetic.

Figure 7:
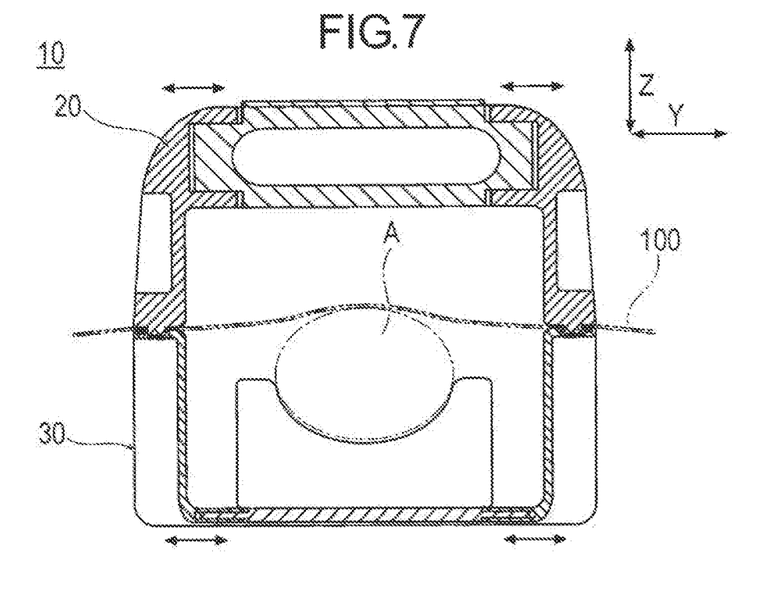
FIG. 7 is a cross-sectional view of a vascular puncture device according to a third modification example.

Furthermore, as in a third modification example illustrated in FIG. 7, the length of the support table 30 and/or the length of the main body 20 in the width direction Y may be changeable. The support table 30 and/or the main body 20 has, for example, a slide mechanism such that the length in the width direction Y can be changed. Accordingly, the width of the support table 30 and/or the width of the main body 20 can be changed to an appropriate width according to the width of the arm A. Therefore, the vascular puncture device 10 can be used regardless of the width of the arm A.

Figure 8A:
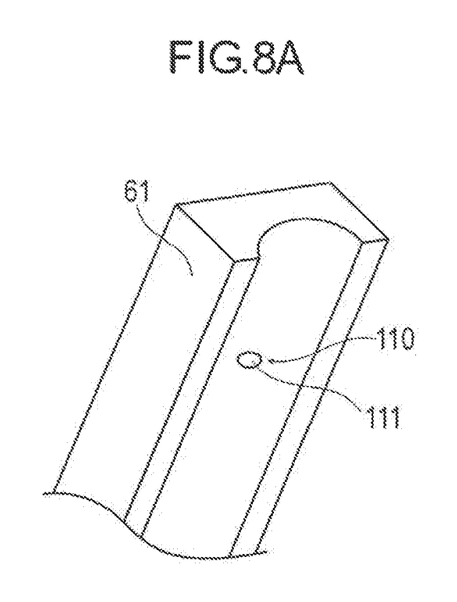
FIG. 8A is a perspective view illustrating a part of a drive unit.
Figure 8B:
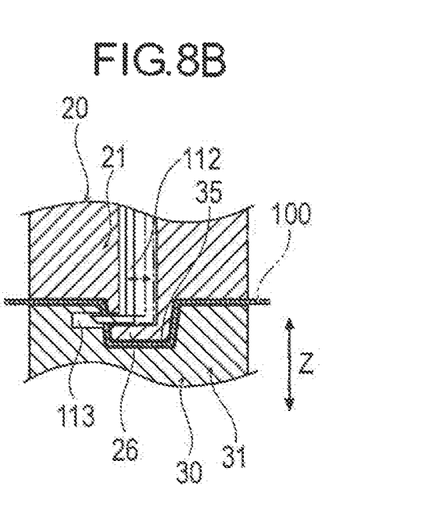
FIG. 8B is a cross-sectional view illustrating a connection portion connecting a support table with a main body.

Furthermore, as in a fourth modification example illustrated in FIGS. 8A and 8B, the vascular puncture device 10 may include a stopper mechanism 110 configured so that the main body 20 cannot be removed from the support table 30 in a state in which the inner needle 51 is inserted into or positioned in the blood vessel. The stopper mechanism 110 includes a detection unit 111 that detects the presence or absence of the inner needle 51 in the vicinity of the puncture unit 50, and a lock mechanism 112 that unremovably connects the support table 30 with the main body 20. The detection unit 111 is, for example, a proximity sensor, a displacement sensor, or the like disposed in the needle holding unit 61 that holds the puncture unit 50. For example, the lock mechanism 112 can protrude from the protrusion 26 of the main body 20 in a direction intersecting the height direction Z with a drive source such as a motor controlled by the control unit 70, and can penetrate the drape 100 and be caught by an engagement portion 113 formed in the recess 35 of the support table 30 when the lock mechanism 112 protrudes. The lock mechanism 112 can also be caught by the engagement portion 113 without penetrating the drape 100. In a case where the inner needle 51 is detected by the detection unit 111, the control unit 70 causes the lock mechanism 112 to be engaged with the engagement portion 113 such that the main body 20 and the support table 30 cannot be removed or separated, and in a case where the inner needle 51 cannot be detected by the detection unit 111, the lock mechanism 112 is operated to be separated from the engagement portion 113 such that the main body 20 can be removed from the support table 30.

Figure 9A:
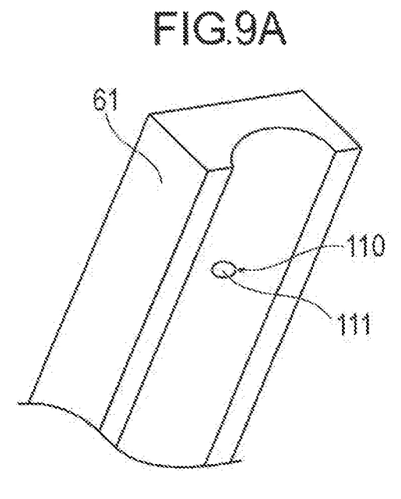
FIG. 9A is a perspective view illustrating a part of a drive unit.
Figure 9B:
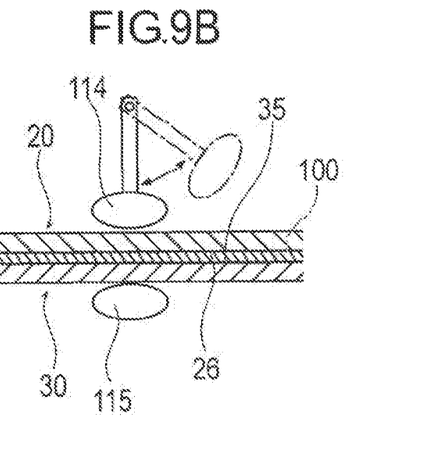
FIG. 9B is a cross-sectional view illustrating a connection portion connecting a support table with a main body.

Furthermore, as in a fifth modification example illustrated in FIGS. 9A and 9B, the stopper mechanism 110 may include, for example, a first magnetic body 114 that is a ferromagnetic body moved by a drive source such as a motor controlled by the control unit 70, and a second magnetic body 115 that is a ferromagnetic body capable of attracting the first magnetic body 114 by magnetic force. The first magnetic body 114 and the second magnetic body 115 are all ferromagnetic bodies, and at least one of the first magnetic body 114 or the second magnetic body 115 is magnetized. Therefore, the first magnetic body 114 and the second magnetic body 115 can attract each other. The first magnetic body 114 is disposed on the main body 20, and the second magnetic body 115 is disposed on the support table 30. In a case where the inner needle 51 is detected by the detection unit 111, the control unit 70 causes the first magnetic body 114 to approach the second magnetic body 115 such that the main body 20 and the support table 30 cannot be removed or separated from one another by virtue of the magnetic force, and in a case where the inner needle 51 cannot be detected by the detection unit 111, the first magnetic body 114 is separated from the second magnetic body 115 and the main body 20 can be removed or separated from the support table 30.

Figure 10A:
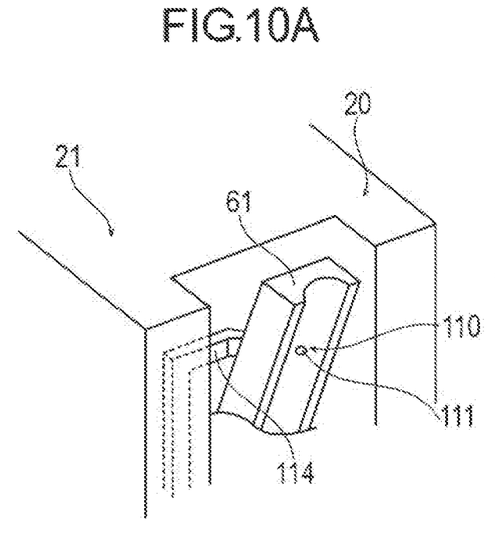
FIG. 10A is a perspective view illustrating a part of a drive unit.
Figure 10B:
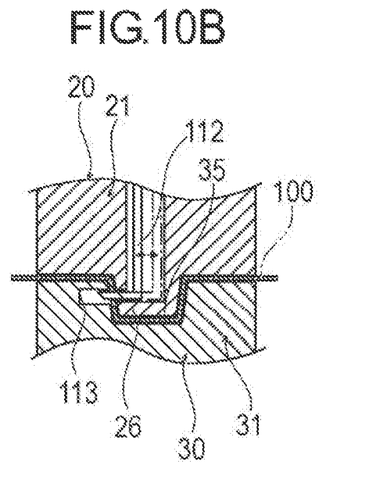
FIG. 10B is a cross-sectional view illustrating a connection portion connecting a support table with a main body.

The detection unit 111 of the stopper mechanism 110 that makes the main body 20 unremovable from the support table 30 may be a mechanical mechanism instead of a mechanism electrically outputting a signal. For example, as in a sixth modification example illustrated in FIGS. 10A and 10B, in a case of a structure in which the needle holding unit 61 holding the puncture unit 50 can be removed together with the inner needle 51, the detection unit 111 includes at least one component 116 that connects the needle holding unit 61 with the lock mechanism 112. When the needle holding unit 61 is removed from the upper frame 21, these components 116 move by the principle of lever, and the lock mechanism 112 is actuated to be disengaged from the engagement portion 113. According to this, the main body 20 can be removed from the support table 30.

Figure 11:
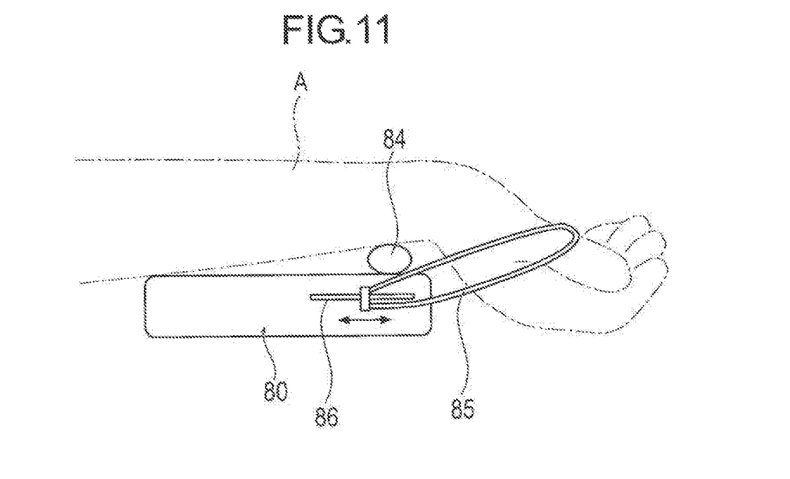
FIG. 11 is a side view of a holding unit of a vascular puncture device according to a seventh modification example.

Furthermore, as in a seventh modification example illustrated in FIG. 11, as a mechanism for bending the wrist of the patient's arm A downward, the holding unit 80 may have an inflatable and deflatable balloon 84 on a surface for holding the arm A. Furthermore, as a mechanism for bending the wrist of the arm A downward, the holding unit 80 may include a loop-shaped string 85 that can be hooked on the palm and a string drive unit 86 that can move the string 85.

The detailed description above describes embodiments of a support table and vascular puncture device representing examples of the new support table and vascular puncture device disclosed here. The invention is not limited, however, to the precise embodiments and variations described. Various changes, modifications and equivalents can be effected by one skilled in the art without departing from the spirit and scope of the invention as defined in the accompanying claims. It is expressly intended that all such changes, modifications and equivalents that fall within the scope of the claims are embraced by the claims.

What is claimed is:

1. A combination of a support table and a main body forming part of a vascular puncture device for puncturing an arm of a human body,
the support table comprising:
a lower frame and an arm holder on which the arm of the human body is positioned during the puncturing of the arm of the human body;
the lower frame including a bottom portion and two spaced-apart side walls that project upwardly away from the bottom portion;
the arm holder being located between the two spaced-apart side walls, the arm holder including an upwardly facing surface that faces the arm of the human body during the puncturing of the arm of the human body, the arm holder being supported on the bottom portion of the lower frame;
the main body comprising:
an upper frame and a needle;
the upper frame being positioned on and supported by the lower frame;
the needle being supported on the upper frame, the needle including a needle tip for puncturing the arm of the human body when the arm of the human body is positioned on the arm holder, the needle being movable relative to the upper frame so that the needle is movable toward the arm of the human body when the arm of the human body is positioned on the arm holder to permit the arm of the human body to be punctured by the needle tip; and
the upper frame being separable from the lower frame.

2. The combination of the support table and the main body according to claim 1, wherein the upwardly facing surface of the arm holder is a groove-shaped surface of the arm holder, the groove-shaped surface being a curved surface.

3. The combination of the support table and the main body according to claim 1, wherein the needle is operatively connected to a motor so that operation of the motor moves the needle relative to the upper frame.

4. The combination of the support table and the main body according to claim 1, and further comprising plural protrusions that are each positioned in a respective recess, each protrusion being provided on either the upper frame or the lower frame, and each recess being provided on either the upper frame or the lower frame.

5. The combination of the support table and the main body according to claim 1, wherein the upper frame includes a top portion and two spaced-apart side walls that project downwardly away from the top portion, each of the side walls of the upper frame includes a support surface at a lower end of the side wall of the upper frame, each of the side walls of the lower frame includes a support surface at an upper end of the side walls of the lower frame, the support surface of each of the side walls of the upper frame being positioned on and supported by a respective one of the support surfaces of the side walls of the lower frame.

6. The combination of the support table and the main body according to claim 1, wherein the upper frame further comprises a probe that generates and transmits an ultrasonic wave and receives the ultrasonic wave reflected from an inside of the arm of the human body when the arm of the human body is positioned on the arm holder.

7. The combination of the support table and the main body according to claim 1, wherein the arm holder provided is made of a deformable material.

8. The combination of the support table and the main body according to claim 1, wherein the upper frame includes a top wall and two spaced-apart side walls that project downwardly away from the top wall, the arm holder including opposite ends that are spaced apart in a length-wise direction, the side walls of the upper frame having first and second ends that are spaced apart in the length-wise direction, the top wall of the upper frame having first and second ends that are spaced apart in the length-wise direction, a distance between the first and second ends of at least one of side walls of the upper frame in the length-wise direction being greater than a distance between the first and second ends of the top wall of the upper frame in the length-wise direction.

9. The combination of the support table and the main body according to claim 1, wherein the needle is positioned in and movable relative to an outer tube.

10. The combination of the support table and the main body according to claim 1, further comprising a connection portion provided on the support table for connecting the support table to the main body.

11. The combination of the support table and the main body according to claim 1, further comprising a connection portion provided on the support table to connect the support table to the main body, wherein the connection portion of the support table includes a visual recognition unit that is visually recognizable.

12. The combination of the support table and the main body according to claim 1, further comprising a connection portion provided on the support table to connect the support table to the main body, the connection portion of the support table including a protrusion or recess to be directly fitted to a recess or protrusion respectively provided on the main body, wherein the recess or protrusion of the connection portion of the support table includes a visual recognition unit that is visually recognizable.

13. The combination of the support table and the main body according to claim 1, wherein the support table includes a holding unit configured to hold the arm of the human body, the holding unit including a holding surface comprised of a first holding surface for holding an elbow side of the arm and a second holding surface for holding a wrist side of the arm, and
a height from a bottom surface of the support table to the second holding surface is higher than a height from the bottom surface to the first holding surface.

14. The combination of the support table and the main body according to claim 1, wherein the support table includes a holding unit configured to hold the arm of the human body, the holding unit being deformable.

15. The combination of the support table and the main body according to claim 13, wherein the holding surface is inclined with respect to the bottom surface of the support table.

16. The combination of the support table and the main body according to claim 1, wherein the main body includes: an imaging unit that is brought into contact with a skin surface of the arm of the human body during use of the vascular puncture device and that captures a cross-sectional image of the arm; and a display configured to display the cross-sectional image captured by the imaging unit.

17. A support table for supporting a main body including an imaging unit that is configured to contact a skin surface of an arm of a human body and acquire a cross-sectional image of the arm, a drive unit that moves a puncture needle, and a control unit that is configured to control movement of the drive unit, the support table comprising:
a holding unit that is configured to hold the arm of the human body; and
the support table being configured to support the main body while also allowing the support table and the main body to be separated from one another;
a connection portion provided on the support table for connecting the support table to the main body; and
the connection portion of the support table including a protrusion or recess to be directly fitted to a recess or protrusion respectively provided on the main body, and a gap formed between the protrusion and the recess when the protrusion is directly fitted to the recess.

18. The support table according to claim 10, wherein the support table includes a plurality of spaced apart connection portions at different positions.

19. A support table for supporting a main body including an imaging unit that is configured to contact a skin surface of an arm of a human body and acquire a cross-sectional image of the arm, a drive unit that moves a puncture needle, and a control unit that is configured to control movement of the drive unit, the support table comprising:
a holding unit that is configured to hold the arm of the human body;
the support table being configured to support the main body while also allowing the support table and the main body to be separated from one another;
a connection portion provided on the support table for connecting the support table to the main body; and
the support table includes a plurality of spaced apart connection portions at different positions.

20. The support table according to claim 19, wherein the connection portion of the support table includes a protrusion or recess to be directly fitted to a recess or protrusion respectively provided on the main body, and a gap is formed between the protrusion and the recess when the protrusion is directly fitted to the recess.

* * * * *